Aug. 21, 1928.
H. POUNDS ET AL
1,681,877
DUSTER FOR FORD TRUCKS
Filed June 14, 1927   3 Sheets-Sheet 1
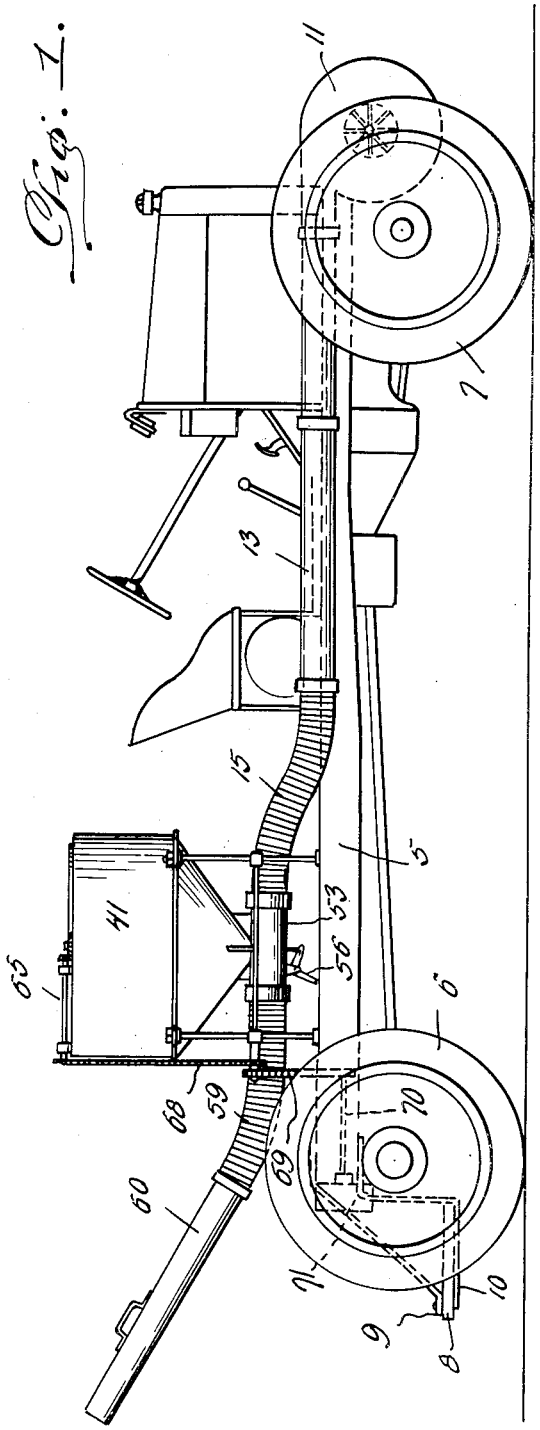
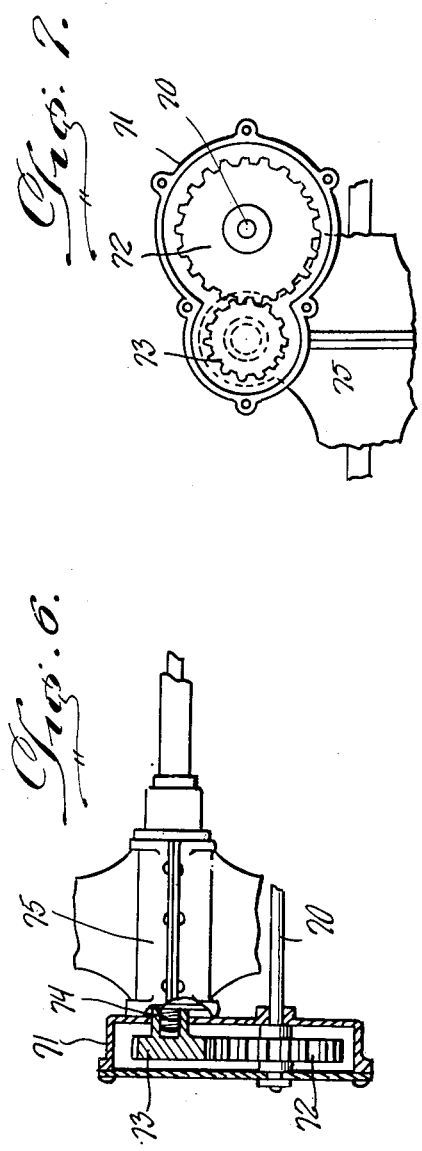
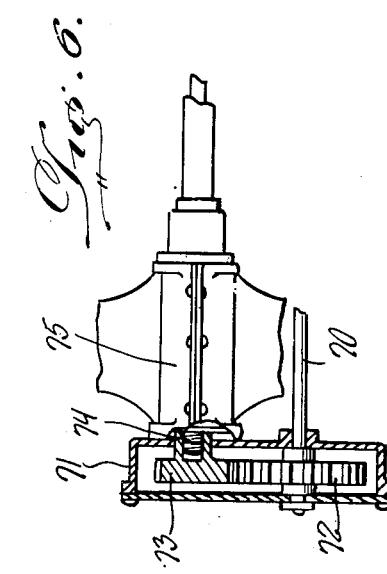
Inventors
Hoyle Pounds
H. E. Patrick,
By Clarence A. O'Brien
Attorney

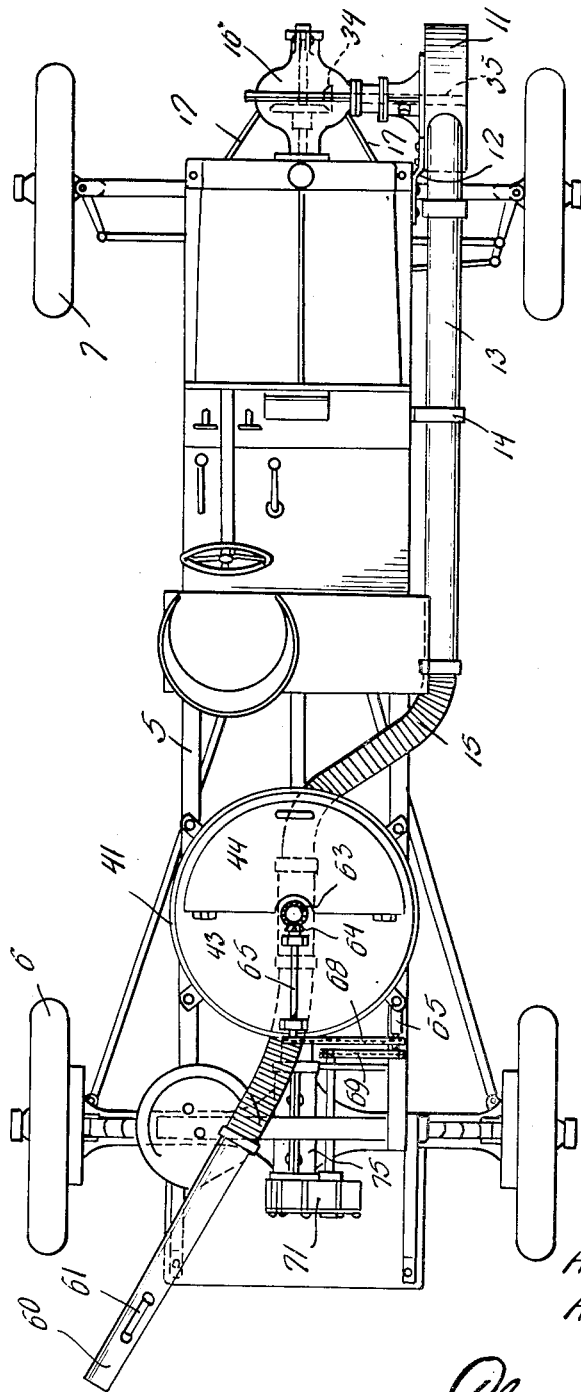

Aug. 21, 1928.
H. POUNDS ET AL
1,681,877
DUSTER FOR FORD TRUCKS
Filed June 14, 1927 3 Sheets-Sheet 3
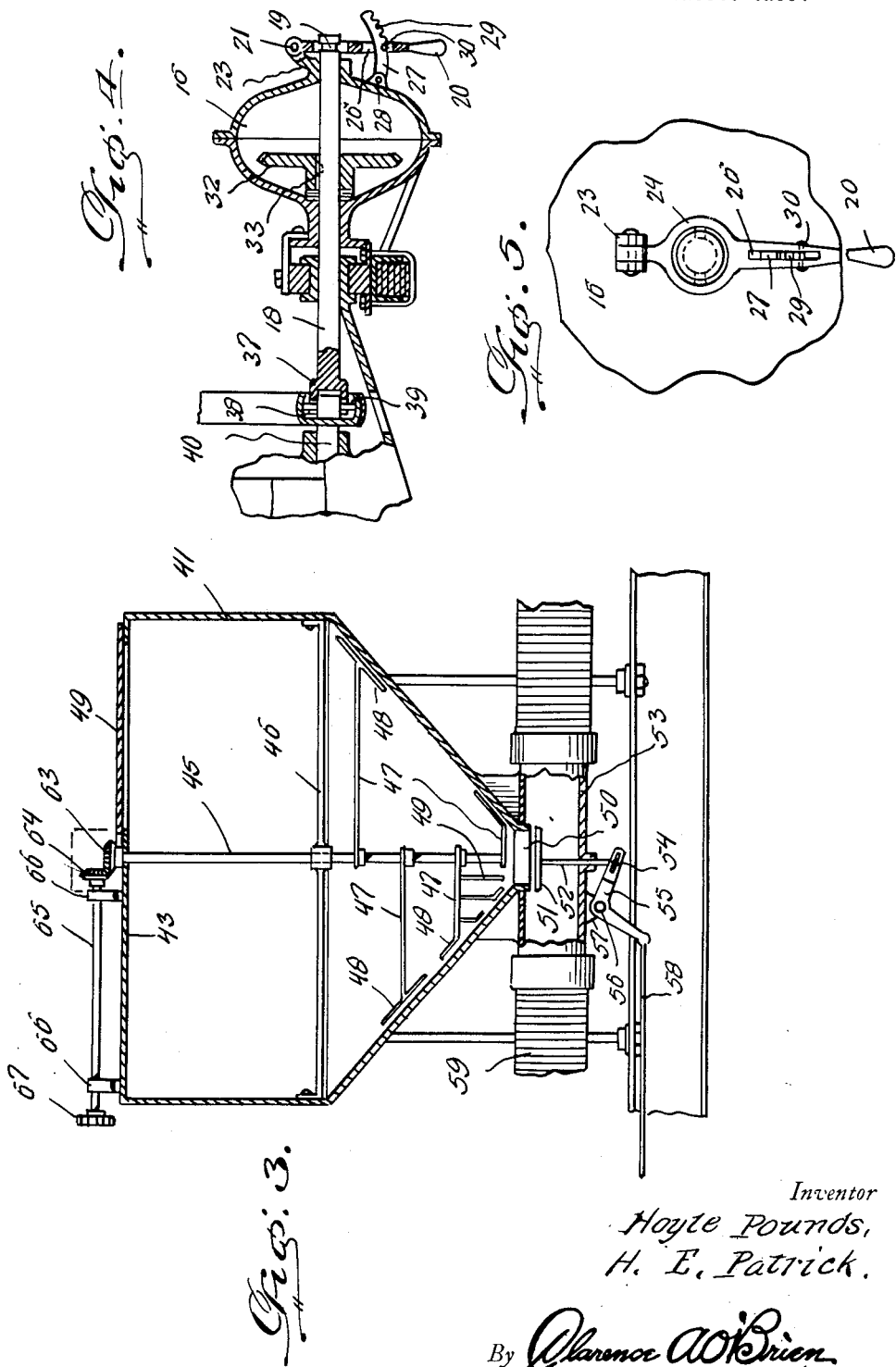
Inventor
Hoyle Pounds,
H. E. Patrick.
By Clarence A. O'Brien
Attorney Patented Aug. 21, 1928.

1,681,877

UNITED STATES PATENT OFFICE.

HOYLE POUNDS AND HENRY E. PATRICK, OF WINTER GARDEN, FLORIDA.

DUSTER FOR FORD TRUCKS.

Application filed June 14, 1927. Serial No. 198,859.

The present invention relates to a duster for plants and the like and has for its principal object to provide an apparatus of this nature which may be mounted upon a Ford truck or the like and operated thereby.

With the above and numerous other objects in view as will appear as the description proceeds, the invention resides in certain novel features of construction, and in the combination and arrangement of parts as will be hereinafter more fully described and claimed.

In the drawing:—

Figure 1 is a side elevation of the apparatus embodying the features of our invention showing the same on a truck, Fig. 2 is a top plan view thereof, Fig. 3 is a vertical section through the hopper and agitating mechanism, Fig. 4 is a detail section through the fan drive mechanism, Fig. 5 is a detail view of the clutch operating means therefor, Fig. 6 is a sectional elevation showing the drive for the agitating mechanism, Fig. 7 is another view thereof.

Referring to the drawing in detail, it will be seen that 5 denotes the chassis mounted on the rear wheels 6 and front dirigible wheels 7 in the usual well known manner. A step 8 is mounted below the rear end of the chassis 5 by suitable brackets 9 and 10.

A fan or blower 11 is mounted to the front right-hand corner of the chassis by means of a bracket 12. A pipe 13 leads rearwardly from the blower 11 being supported in bracket 14 and is connected at its rear end to a flexible pipe 15. A housing 16 is supported by brackets 17 at the front of the truck and has a shaft 18 slidable and rotatable therein, the forward end being grooved as at 19. A lever 20 is pivoted as at 21 to an arm 23 projecting upwardly and forwardly from the housing 16. This lever 20 has a ring portion 24 entering the groove 19 and is also provided with a slot 26 for receiving a pivoted rack 27 pivoted at 28 and having rack teeth 29 which engage pin 30. Obviously, the shaft 18 may be slid forwardly and rearwardly by lifting up upon the rack 27 and operating the lever 20 and the shaft may be held in different adjusted positions by the pin 30 engaging the teeth 29. A beveled gear 32 is splined at 33 on the shaft 18 within the housing 16 and meshes with a beveled gear 34 on the shaft 35 of the fan or blower 11. The inner end of the shaft 18 has a socket 37 provided with slots 38 to receive the usual pin 39 on the end of the crank shaft 40. It will be seen that the shaft 18 takes the place of the usual hand crank of the truck. Obviously, by sliding this shaft in and out, it may be engaged and disengaged in respect to the crank shaft 40 for operating the fan 11.

The numeral 41 denotes a hopper the lower end of which is of conical formation as is denoted at 42. The top of the hopper 41 is closed as at 43 and has a removable cover 44 over an opening therein. A shaft 45 is journaled through the top 43 and in a bracket 46 extending diametrically of the hopper. A plurality of arms 47 radiate from the shaft 45 within the conical portion 42 and have agitators 48 mounted thereon at their ends. One of the arms 47 is provided with other agitators 49. The lower end of the hopper is open as at 50. A valve 51 is associated with the opening 50 and is mounted on a stem 52. A tubular portion 53 is disposed at the open end of the conical portion 42 and the valve 51 is located therein, the stem 52 being slidable through the wall thereof and has a pin and slot connection 54 with the bell crank 55 pivoted at 56 on a bracket 57 depending from the tubular portion 53. If this bell crank is rocked by a rod 58 operable from a convenient point on the truck. A flexible pipe 59 extends from the rear end of the tubular portion 53. The flexible pipe 15 is connected with the forward end of the tubular portion 53. A suitable nozzle 60 is connected with the flexible pipe 59 and has a handle 61 there on in order that it may be pointed in different directions for spraying the dust. At the upper end of the shaft 45 there is mounted a beveled pinion 63 meshing with the beveled pinion 64 on a shaft 65. The shaft 65 is journaled in bearings 66 on the top 43 and has a sprocket 67 at its end. A chain 68 is trained over the sprocket 67 and is operatively connected with the chain and sprocket mechanism 69 which in turn is driven by a shaft 70. The shaft 70 is journaled in a housing 71 and has a gear 72 fixed thereon within the housing and meshing with a gear 73 which is mounted on the extension of the usual worm shaft 74 of the well-known differential mechanism 75 of the truck. An illustration of a truck differential having a worm and a worm shaft on which the gear 73 may be fixed is shown in the patent to W. F. Rockwell, No. 1,600,738 issued September 21, 1926 and the further illustration thereof is not deemed necessary.

When the shaft 18 is operatively connected with the crank shaft 40 of the engine as has been heretofore explained, it will be seen that a blower sets up a current of air through the pipes 13, 15, tubular member 53, pipe 59 and nozzle 60. By pulling upon the rod 58 and rocking the bell crank 55 the valve 51 may be moved away from the opening 50 so that the dust in the hopper 41 may flow through this opening and be caught in the draft of air through the tubular member 53 so as to be sprayed through the nozzle 50 on the plants, trees, or the like. The dust in the hopper will be thoroughly agitated by the rotation of the shaft 45 through pinions 66 and 64 operated by shafts 65 in the manner heretofore explained from the differential of the truck. The rotation of this shaft 45 causes the swinging of the arms 47 and the movement of the agitators 48 and 49 thereon.

It is thought that the construction, operation, and advantages of the invention will now be apparent to those skilled in this art without a more detailed description thereof. The present embodiment of the invention has been disclosed in detail merely by way of example since in actual practice it attains the features of advantage enumerated as desirable in the statement of the invention and the above description. It is apparent that changes in the details of construction and in the combination and arrangement of parts may be resorted to without departing from the spirit or scope of the invention as hereinafter claimed or sacrificing any of its advantages.

Having thus described our invention, what we claim as new is:—

1. In a combination, a motor vehicle truck including a differential, a housing supported by the differential, a pinion in the housing and rotatable by the differential, a gear in the housing and meshing with the pinion, a shaft journaled through the housing on which is fixed said gear, a hopper mounted on the truck, an agitating shaft in the hopper, agitating means on the shaft, means for driving the shaft from the first mentioned shaft, a blower mounted on the truck, a tubular member at the bottom of the hopper and communicating therewith, said blower being adapted to create a draft through the tubular member, a valve for closing all communication between the tubular member and the hopper, and means for operating the valve.

2. In combination, a motor vehicle truck including a differential, a housing supported by the differential, a pinion in the housing and rotatable by the differential, a gear in the housing and meshing with the pinion, a shaft journaled through the housing on which is fixed said gear, a hopper mounted on the truck, an agitating shaft in the hopper, agitating means on the shaft, means for driving the shaft from the first mentioned shaft, a blower mounted on the truck, a tubular member at the bottom of the hopper and communicating therewith, said blower being adapted to create a draft through the tubular member, a valve for closing all communication between the tubular member and the hopper, means for operating the valve, a flexible pipe leading from the tubular member, and a nozzle on the flexible pipe.

In testimony whereof we affix our signatures.

HOYLE POUNDS.
HENRY E. PATRICK.